(12) United States Patent
Ismail

(10) Patent No.: US 7,755,225 B2
(45) Date of Patent: Jul. 13, 2010

(54) RECOILLESS VOICE COIL ACTUATOR AND METHOD

(75) Inventor: James Samir Ismail, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 249 days.

(21) Appl. No.: 12/059,022

(22) Filed: Mar. 31, 2008

(65) Prior Publication Data

US 2009/0243403 A1    Oct. 1, 2009

(51) Int. Cl.
    *H02K 41/03*    (2006.01)
(52) U.S. Cl. .................. 310/12.16; 310/13; 310/17
(58) Field of Classification Search ............. 310/12.16, 310/12.21, 12.19, 12.33, 12.27, 13, 17, 24
    See application file for complete search history.

(56) References Cited

U.S. PATENT DOCUMENTS

| | | | |
|---|---|---|---|
| 3,699,555 A | 10/1972 | DuVall | |
| 4,144,466 A * | 3/1979 | Hatch | 310/13 |
| 4,661,729 A | 4/1987 | Hames et al. | |
| 5,146,122 A | 9/1992 | Hearn et al. | |
| 6,323,935 B1 * | 11/2001 | Ebihara et al. | 355/53 |
| 6,661,129 B2 * | 12/2003 | Tamura et al. | 310/12.16 |
| 2002/0130562 A1 * | 9/2002 | Tamura et al. | 310/12 |
| 2003/0127916 A1 * | 7/2003 | Godkin | 310/12 |
| 2008/0036304 A1 * | 2/2008 | Ho et al. | 310/12 |
| 2008/0284255 A1 * | 11/2008 | Liu et al. | 310/12 |

FOREIGN PATENT DOCUMENTS

| | | |
|---|---|---|
| EP | 0 162 721 B1 | 9/1990 |
| WO | 90/10931 A1 | 9/1990 |

* cited by examiner

*Primary Examiner*—Thanh Lam
(74) *Attorney, Agent, or Firm*—Young Basile

(57) ABSTRACT

A recoilless voice coil actuator and method having flexures connected to both the magnet and the voice coil allowing independent movement of both the magnet and the voice coil in the direction of actuation. The stiffness or resistance to movement of the flexures is selected so that the natural frequencies of the magnet and the voice coil along the direction of actuation are substantially the same.

20 Claims, 2 Drawing Sheets

RECOILLESS VOICE COIL ACTUATOR AND METHOD

FIELD OF THE INVENTION

The invention generally pertains to voice coil-type actuators or motors.

BACKGROUND

Actuators utilizing a voice coil and a magnet are known and have been in use for many years and in a wide array of applications. Due to the elementary physics principle that momentum in a closed system is conserved, movement of the voice coil from reaction to the opposing magnetic fields produces an equal and opposite reactionary force or recoil on the stationary body, in this example, the magnet. Likewise, in a grounded voice coil configuration, where the magnet moves and the voice coil is stationary, the recoil or reactionary force is imparted to the voice coil.

In sensitive equipment, for example computer disc drives and laser trimming equipment for electrical circuit resistors and capacitors, this recoil force, if not sufficiently dampened or otherwise managed, can become a problem and affect the accuracy of the principal device. For example, in laser trimming of electrical resistors or capacitors, the laser is typically used in combination with a highly sensitive measuring device to test the properties of the altered component. The laser and mirrors may be actuated by galvanometers in closed loop servo control systems to direct the laser to the desired area on the work piece. Rapid movement of the laser and mirrors causes momentum which, if not dampened or otherwise managed, could adversely affect the measurement device and compromise the accuracy of measurement. An example of a laser trimming device is Electro Scientific Industries, Inc. Model 2100 which is the assignee of the present invention.

The need to dampen the recoil force has long been sought after and many designs have attempted to eliminate or completely neutralize the recoil force with limited success. One past design is U.S. Pat. No. 5,146,122 for a Voice Coil Actuator with Resiliently Mounted Shorted Turn. In this design, an additional shorted turn component is introduced and placed in contact with the magnet to absorb recoil forces imparted on the magnet by a voice coil carriage. An alternate design is in U.S. Pat. No. 3,699,555 for an Apparatus for Rapid Action Displacement Control. In this design, the magnet/stator is mounted on roller bearings positioned on rods. The transducer carriage is mounted on wheels that ride on tracks.

These designs include additional complex precision components such as the shorted turn and require additional assembly steps which add cost and time to manufacture and assemble the device. Neither device includes a flexure as they incorporate bearings or isolators to dampen the recoil. Neither design is believed to produce a truly recoilless actuator.

Past designs that have employed dampeners or flexures on either the voice coil (in a magnet-grounded configuration) or on the magnet (in a voice coil-grounded configuration) in an attempt to reduce or eliminate the resultant recoil forces experienced by the grounding structure, do not produce a recoilless system with respect to the ground structure.

Therefore, there is a need for a method of operation and an actuator employing a flexure for both the magnet and the voice coil assemblies to substantially reduce or completely eliminate recoil forces previously experienced by the grounding structure to improve the performance of the actuator and the surrounding system or equipment.

SUMMARY

The present recoilless actuator generally includes a permanent magnet, a voice coil capable of receiving an electrical current, and supports to positionally maintain the voice coil within the magnetic field of the magnet and grounding structure.

In one example of the invention, the recoilless actuator includes independent first and second flexure plates connected to the magnet support and a third independent flexure plate connected to the voice coil support. The third flexure plate dedicated to the voice coil may be similarly constructed and operates to manage the forces imparted on the voice coil. Both the magnet and the voice coil, and their respective flexure plates, are connected to two grounding plates on opposite ends of the flexure plates thereby flexibly suspending the magnet and the voice coil by the respective flexure members. Through selection of the spring rate or stiffness of the respective flexure members to achieve the same natural frequency of the magnet assembly and the voice coil assembly, the generated momentums of both the magnet and voice coil are equal and conserved, thus imparting no recoil or residual forces on the grounding plates. Once assembled, the actuator can be tuned or adjusted by adding or removing mass to one or both of the voice coil assembly and magnet assembly.

In one example, each flexure plate includes an inner portion connected to an outer portion by two independent flexures on opposite sides of the inner portion. Each flexure includes two flexure bands to manage any actuation or recoil forces to the respective voice coil and magnet.

In one example of a flexure, the first flexure band is connected to a first edge of the inner portion and the second flexure band is connected to a second edge of the inner portion.

In other examples of linear and non-linear forms of the invention, the actuator includes a first flexure for the magnet support and a second flexure for the coil support resulting in substantially no recoil forces in the directions of actuation on movement of the coil and the magnet.

A method of producing a recoilless actuator is further disclosed. One example of the method includes providing a permanent magnet in axial alignment with a voice coil capable of receiving electrical current producing axial movement of the coil with respect to the magnet along a longitudinal axis. The magnet and voice coil are each independently connected to at least one flexure plate including individual flexures having a selected spring rate which manage the respective forces imparted on the voice coil and the magnet resulting in zero recoil forces being experienced at the grounding plates attached to the flexure plates.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Mathematically, in a voice coil actuator assembly, where the coil assembly has a mass $m_1$, the magnet assembly has a mass $m_2$, and their respective supporting structures have spring rates or stiffnesses $k_1$ and $k_2$, when a current is generated in the coil, a magnetic field is produced by the coil that reacts against the magnetic field produced by the magnet. A resulting linear force f is produced in directions opposite the radial magnetic fields. Beginning with Newton's Third Law, F=ma, the equations of motion or displacement for both the voice coil and magnet assemblies ($x_1$ and $x_2$ respectively) are the same up to the values of their respective masses and flexural stiffnesses.

$$f - k_1 x_1 = m\ddot{x}_1$$
$$f = (m_1 s^2 + k_1)x_1$$
$$x_1 = \frac{1}{m_1 s^2 + k_1} f$$

In the above equation, s represents the Laplace variable and is assumed that zero initial conditions are present. Similarly, the displacement of the magnet 14 assembly is:

$$x_2 = \frac{1}{m_2 s^2 + k_2} f$$

In view that the momentum of each of the coil and magnet assemblies must be equal and opposite for the grounding structure or plates 44 to remain stationary:

$$m_1 \dot{x}_1 = m_2 \dot{x}_2$$

$$\frac{m_1 s}{m_1 s^2 + k_1} f = \frac{m_2 s}{m_2 s^2 + k_2} f$$

$$\Rightarrow m_1 s(m_2 s^2 + k_2) = m_2 s(m_1 s^2 + k_1)$$

$$m_1 m_2 s^3 + m_1 k_2 s = m_1 m_2 s^3 + m_2 k_1 s$$

$$m_1 k_2 s = m_2 k_1 s$$

$$\frac{k_2}{m_2} = \frac{k_1}{m_1} \qquad \text{Equation (1)}$$

Further, by definition, the natural frequency of a mass-spring oscillator is represented by:

$$w_1 = \sqrt{\frac{k}{m}}$$

In view of Equation (1) above, it follows that by selecting the stiffness k of each flexure such that the natural frequency of the magnet assembly is equal to that of the coil assembly, the momentum generated by the coil's motion will be equal and opposite to that of the magnet (for zero equal conditions). As a result, the momentum in the system due to actuation of the voice coil is conserved between the voice coil and the magnet, leaving no residual momentum or recoil imparted to the stationary grounding body. Under these circumstances, recoilless actuation is achieved.

Figure 1:
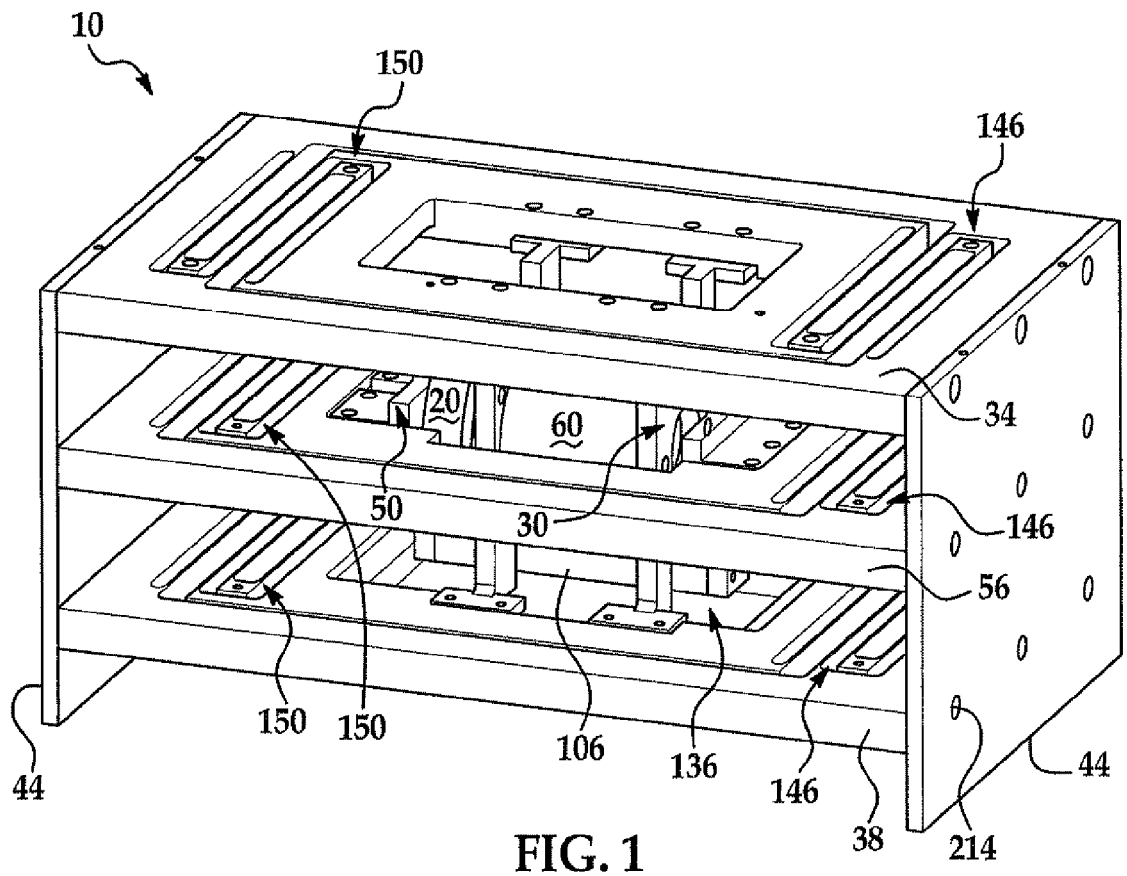
FIG. 1 is a perspective view of an example of an assembled recoilless voice coil actuator.
Figure 2:
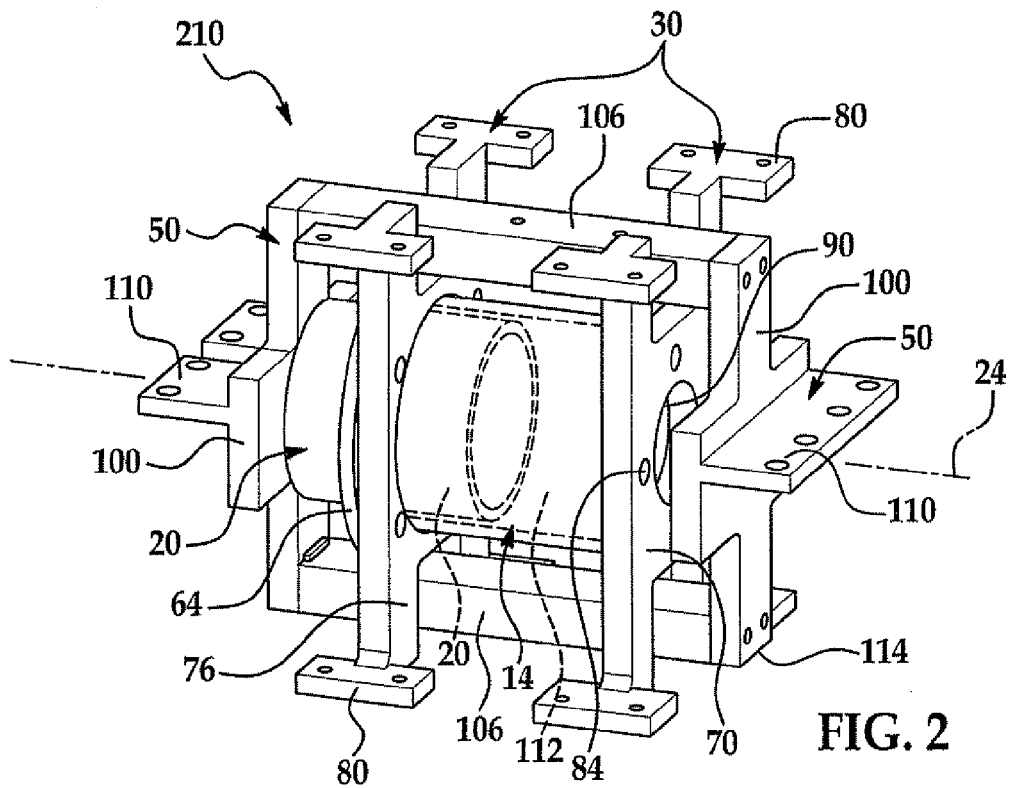
FIG. 2 is a partial perspective view of the actuator of FIG. 1 showing the supports for the magnet and voice coil.

An example of a recoilless voice coil actuator 10 incorporating a first flexure on the magnet and an independent second flexure on the voice coil is shown in FIGS. 1-4. Referring to FIGS. 1 and 2, the recoilless actuator 10 includes a magnet 14, a voice coil 20, a magnet support 30, a voice coil support 50 and first, second and third flexure plate 34, 38 and 56 respectively. As more fully described below, the magnet 14 and its support 30 are independently attached to a first flexure shown as a first and a second flexure plates 34, 38 and the voice coil 20 and its support 50 are independently attached to a second flexure shown as a third flexure plate 56. All three flexure plates are then connected to two independent grounding plates 44. The use of flexures for both of the magnet 14 and the voice coil 20 allows relative movement between the magnet 14 and the voice coil 20 along a longitudinal axis 24. As shown below, when the spring rate or stiffness of the flexures are appropriately chosen, a substantially recoilless, or in a preferred example, a completely recoilless actuator 10 is achieved.

Figure 3:
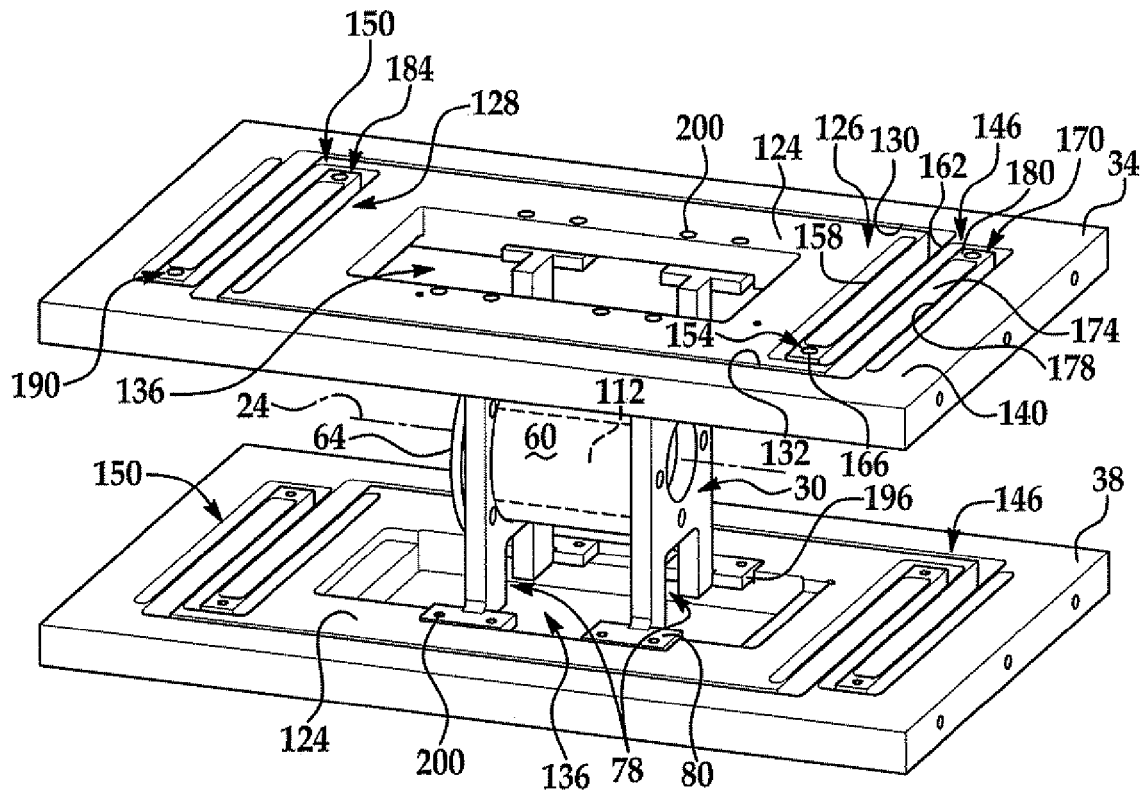
FIG. 3 is a partial perspective view of the actuator in FIG. 1 showing the magnet, magnet support and first and second flexure plates.

Referring to FIG. 3, magnet 14 includes a base 60 positioned along longitudinal axis 24 and may include a flange 64 extending radially outward from the base. Magnet 14 is preferably a permanent magnet generating a constant radially oriented magnetic field. The size, configuration and strength of the magnet will vary with the application. Use of an electromagnet is further contemplated.

The magnet 14 is connected to magnet support 30. In one example, support 30 includes a first rigid end plate 70 and a similarly configured second rigid end plate 76 positioned apart from first end plate 70 along the longitudinal axis 24 such that magnet base 60 is positioned between the support plates as best seen in FIGS. 2 and 3. First end plate 70 and second end plate 76 have slots 78 at opposing ends which are respectively aligned along longitudinal axis 24. As best seen in FIG. 2, each support plate 70 and 76 includes 4 mounting flanges 80 extending from the respective plates in a direction substantially perpendicular to longitudinal axis 24. Magnet 14 is connected to the first 70 and second 76 plates through apertures 84 using fasteners (not shown). The first 70 and second 76 support plates are preferably made from a non-ferrous metal such as aluminum but other materials known by those skilled in the art may be used.

Figure 4:
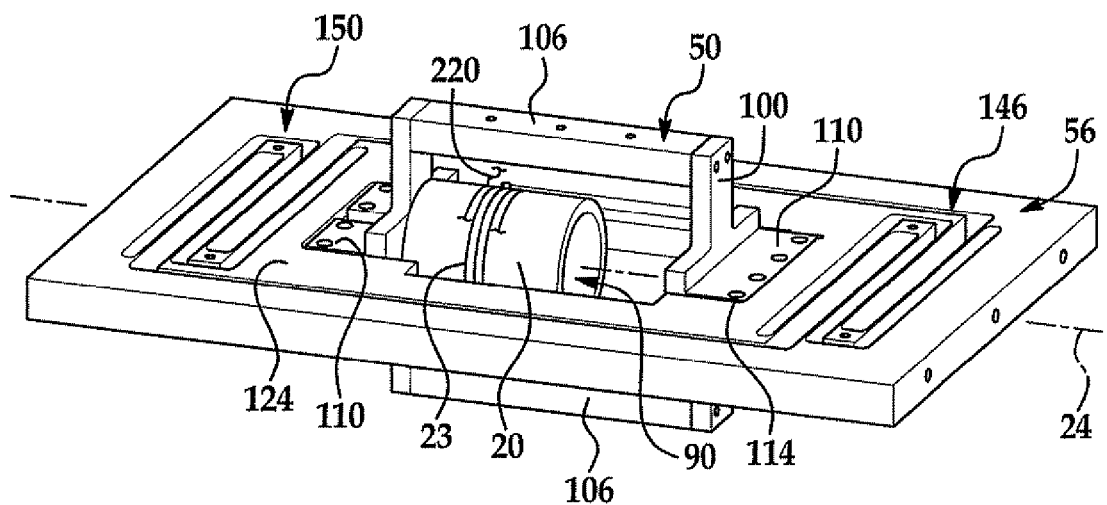
FIG. 4 is a partial perspective view of the actuator in FIG. 1 showing the voice coil, voice coil support and a third flexure plate.

Referring to FIGS. 2 and 4, voice coil 20 is of conventional design including a bobbin or cylindrical shaped, hollow core 22 wrapped by a continuous coil of conductive wire 23 defining an axial opening 90. Wire coil 23 is attached to a source of electric current 220.

The size, configuration and current capacity of the coil 20 will vary in ways known by those skilled in the art to suit the particular application and performance requirements. For example, an open face-type voice coil, as opposed to a bobbin-type coil as described and illustrated, may be used with a suitable magnet.

Voice coil 20 is connected to a coil support 50 to suitably position and maintain coil 20 in a spatial relationship to the magnetic field produced by magnet 14 for proper operation of the voice coil actuator or motor. In one example, support 50 includes a pair of rigid end plates 100 separated along the longitudinal axis by rigid cross members 106. Coil support 50 further includes mounting flanges 110 extending outward from the end plates 100 along the longitudinal axis 24. Coil 20 includes a closed end (not shown) which abuts and is connected to an end plate 100 through fasteners (not shown). Coil support 50 with attached coil 20 is positioned with respect to magnet support 30 substantially aligned along longitudinal axis 24 as best seen in FIG. 2. In this position, a portion of coil 20 is positioned within a cylindrical axial bore 112 in magnet 14 leaving a portion extending beyond magnet collar 64. Through use of the coil support 50 and magnet support 30, the coil 20 is suspended within the magnetic field of the magnet and may only move in a direction along the longitudinal axis 24 with respect to the magnet 14 as more fully described below.

Referring to FIG. 1, in a preferred example of actuator 10, independent first 34, second 38 and third 56 flexure plates are used in combination with the magnet and coil supports. Together, the three flexure plates function to manage and substantially eliminate, or eliminate altogether, any recoil forces that would otherwise be experienced at grounding plates 44 that are initially generated by the forced movement of voice coil 20 with respect to magnet 14 on application of an electrical current through the wire coil 23 in voice coil 20.

Referring to FIG. 3, an example of first flexure plate 34 is illustrated. First flexure plate 34 includes a center portion 124 and an outer portion 140 encircling the center portion. The center portion includes a first end 126, a second end 128 spaced from the first end along longitudinal axis 24, a first edge 130 and a second edge 132 spaced in a direction transverse to the longitudinal axis 24. Center portion 124 further includes a through opening 136 positioned between the first 126 and second 128 ends. The first, second and third flexure plates are preferably made from a copper beryllium alloy which is strong and exhibits good fatigue resistance characteristics. In a preferred example, flexure plate 34 is rectangular in shape with a thickness of approximately one half inch or 12.7 millimeters (mm). It is understood that other materials, shapes and sizes known by those skilled in the art may be used for the flexure plates.

The center portion 124 is connected to the outer portion through a first flexure 146 at the first end 126 and a second flexure 150 at the second end 128. First flexure 146 includes a first flexural band 154 and a second flexural band 170. In the example of first flexure 146 shown, first band 154 includes a first member 158 connected to the first edge of center portion 124 and a second member 162 connected to the first member through end 166. The opposing end of second member 162 is connected to the outer portion 140. Similarly, although shown generally symmetrically opposite across longitudinal axis 24, second flexural band 170 includes a first member 174 connected to the second edge 132 of the center portion, a second member 178 connected to the first member through an end 180, and the opposing end of the second member is connected to the outer portion 140 as generally shown.

Second flexure 150 adjacent to the center portion second end 128 is similarly constructed to the first flexure 146 with the exception that the first 184 and second 190 bands are connected in an opposite manner to the center portion 124. In other words, for example, the second flexure 150 first band first member is connected to the second edge 132 of the center portion 124 whereas the first flexure 146 first band first member is connected to the center portion first edge 130 as described above. It is understood that the connection of the respective bands to the first 130 and second edge 132 of the center portion 124 may alternate or vary from the illustration without deviating from the invention.

The connection of the center portion 124 to the outer portion 140 through first 146 and second 150 flexures provides for reciprocal movement of, for example the magnet 14 and attached support 30 shown in FIG. 3, in a direction along longitudinal axis 24 against the biasing forces provided by the first 146 and second 150 flexures. In a preferred example, center portion 124 remains fixed from any substantial movement in all other directions except along longitudinal axis 24.

In an example of the actuator 10, the second 38 and third 56 flexure plates each include a center portion 124 and an outer portion 140 connected by a first 146 and a second 150 flexure in the manner described above as best seen in FIGS. 3 and 4. It is understood at the shapes configurations and orientations of the flexure in the second 38 and third 56 flexure plates may deviate from first plate 34 and each other. Preferably, the plates are substantially identical in the flexure areas as described in the example below.

As best seen in FIG. 2, in a preferred method of providing and assembling a recoilless actuator 10, the voice coil 20 and attached support 50 are positioned over and nested within magnet support 30 such that coil 20 is partially inserted into the cylindrical bore 112 in magnet 14. The last of the two crossbars 106 is installed on support 50 preventing removal of the two assemblies from one another and forming a magnet coil assembly 210.

Referring to FIGS. 1 and 4, in one example of assembly, the magnet coil assembly 210 is mounted to the third flexure plate 56 (only support 50 and voice coil 20 are shown in FIG. 4 for purposes of illustration only). Voice coil support flanges 110 are secured to third flexure plate 56 with fasteners 114

Third flexure plate 38 is then installed and secured to magnet support 30 through placement of support flanges 80 in slots 196 using fasteners 200. As best seen in FIG. 1, in this position, the coil support lower crossbar 106 is positioned in opening 136 allowing movement of coil 20 and support 50 along the longitudinal axis 24 with respect to magnet 14.

The first flexure plate 34 is then positioned above magnet support 30 and secured to support flanges 80 in a similar manner as described for second flexure plate 38. It is understood that first flexure plate 34 may be installed and secured prior to third flexure plate 38.

The assembled supports and flexure plates are secured to two grounding plates 44 through fasteners 214 to complete the assembly of actuator 10. The position of the attachment points and fasteners 214 in the grounding plates 44 are such that the third flexure plate 56 supporting the voice coil 20 and support 50 maintain the desired position of voice coil 20 within magnet 14 as previously described while allowing linear movement of the coil 20 along longitudinal axis 24 with respect to the magnet 14. In this position, the first 146 and second 150 flexures on the respective flexure plates permit independent movement of voice coil 20 and magnet 14 along longitudinal axis 24. It is understood that different sequences of assembling the various components to achieve the assembled actuator 10 may be used without deviating from the present invention.

In operation, an electrical current is generated and provided to the wire coil 23 on the voice coil 20 through a wire 220 or through other means known by those skilled in the art. The electrical current generates a magnetic field that opposes the magnetic field generated by the permanent magnet thereby creating a hi-directional force on the voice coil 20 and connected support 50 as well as the magnet 14 and connected support 30. In order to achieve zero recoil forces at the grounding plates 44, the natural frequency of the voice coil 20 and connected support 50 and the magnet 14 and connected support 30 must be substantially equal. By calculating the known or anticipated quantities of the masses of each of the magnet and voice coil assemblies: the stiffness k of each of the first 146 and second 150 flexures in the respective first 34, second 38 and third 56 flexure plates can be selected to maintain this equality resulting in zero recoil or residual forces on grounding plates 44.

In one example of actuator 10 generally shown in FIGS. 1-4, the first 34, second 38 and third 56 flexure plates were made from stock plates by wire EDM process. The three plates were stacked atop one another and the principle features, including the first 146 and the second 150 flexures, were simultaneously cut so that the stiffness k of the first flexures 146 in all three plates was the substantially same. The same process was used for second flexures 150 ensuring that the stiffness k for the second flexures 150 in all three flexure plates was substantially the same. As the magnet 14 in the illustrated example is connected to both of the first 34 and second 38 flexure plates, and the voice coil 20 is only connected to the third flexure plate 56, the magnet 14 exhibits two times the stiffness or resistance to movement of the voice coil along the longitudinal axis 24. Under the mathematical Equation 1 above, as the stiffness is twice as great for the magnet 14 as compared to the stiffness for the voice coil 20, in order for the natural frequencies to remain equal so that the momentum is completely conserved or dissipated, it follows that the mass of the magnet and its support 30 would need to be two times the mass of the voice coil 20 and its support 50 to achieve zero recoil forces at the grounding plates 44. Through use of Equation 1 and the equation for the natural frequency of a mass spring oscillator, on calculating the respective masses for the voice coil and the magnet, the appropriate stiffness values k and be calculated.

In one exemplary application, a pair of recoilless actuators 10 may be used in a laser trimming apparatus (not shown). In the example, a first actuator 10 is connected to and moves x-axis turn mirrors which direct a laser beam to y-axis turn mirrors in a second actuator 10 (not shown) positioned in-plane and perpendicular to the first actuator 10, and with its grounding plates 44 affixed to the first actuator's 10 center portion 124, and lenses used to direct the laser to a work piece, for example a resistor or capacitor. Due to the recoilless nature of the actuator, the laser can be used with highly sensitive measuring devices without compromising the function or accuracy of the measuring device or surrounding environment. It is understood that the actuator 10 is not limited to use in laser trimming operations and is useful wherever low or zero recoil of an actuator is desired.

It is understood that different stiffnesses of the flexures, as well as different masses may be used to suit the particular application and performance specifications without deviating from the present invention. It further is understood that following fabrication and assembly of an actuator according to the present invention that does not initially provide for zero recoil due to imperfections in the materials, fabrication and/or assembly, the actuator may be tuned or adjusted through addition or removal of mass until the level of reduced recoil, or zero recoil, is achieved. It understood that other forms of actuator 10 beyond the example illustrated in FIGS. 1-4 may be used without deviating from the present invention provided that one or more flexures are used for both of the magnet and the voice coil in a manner consistent with the above explanations. For example, first 146 and second 150 flexures can take forms other than the first 154 and second 170 band structures illustrated in FIGS. 1-4. Common springs and other dampening devices that provide a controlled stiffness are expressly contemplated by the present invention. Equally, the use of flexure plates incorporating the first 146 and second 150 flexures may take other forms than that illustrated provided the natural frequencies between the coil and magnet remain equal or substantially equal as desired. Also, although only a single axis or single degree of movement actuator 10 as been illustrated, two or more recoilless actuators 10 may be used together and positioned relative to each other to achieve recoilless actuation in multi-axes or multiple degrees of freedom. It is also understood that although illustrated as a linear actuator, non-linear actuators, for example an angular or radial actuator, may be used.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A recoilless voice coil actuator comprising:
a voice coil motor having a voice coil and a magnet;
a magnet support connected to the magnet;
a voice coil support connected to the voice coil for maintaining alignment of the voice coil with the magnet and permitting relative movement of the voice coil and the magnet;
a first flexure connected to the magnet support;
a second flexure connected to the voice coil support; and
a stationary ground plate connected to both of the first flexure and the second flexure, wherein the ground plate receives substantially no recoil forces in the direction of actuation on movement of the voice coil and the magnet.

2. The actuator of claim 1 wherein the magnet is positioned along a longitudinal axis and the voice coil is positioned in axial alignment with the magnet along the longitudinal axis, wherein the magnet and the voice coil move relative to each other along the longitudinal axis and the ground plate receives no recoil forces along the longitudinal axis.

3. The actuator of claim 1 wherein the first and the second flexure each further comprise an independent flexure plate connected to one of the respective magnet support and the voice coil support and the ground.

4. The actuator of claim 3 wherein the flexure plate includes an inner portion connected to one of the respective magnet support and the voice coil support and an outer portion connected to the ground, the inner portion is connected to the outer portion by one of the respective first and the second flexure.

5. The actuator of claim 4 wherein the flexure connecting the inner portion to the outer portion comprises a first flexure connected to a first end of the inner portion and a second flexure connected to a second end of the inner portion separated from the first end along the longitudinal axis.

6. The actuator of claim 3 wherein the first flexure connected to the magnet support comprises a first flexure plate and a second flexure plate and the second flexure connected to the voice coil support comprises a third flexure plate positioned between the first and the second flexure plates.

7. The actuator of claim 2 wherein the magnet includes an axial bore positioned along the longitudinal axis and at least a portion of the voice coil is positioned within the magnet axial bore.

8. A recoilless voice coil linear actuator comprising:
a magnet having a bore centered about a longitudinal axis;

a voice coil axially aligned with and at least partially positioned within the bore, the voice coil in communication with a source of electric current;

a magnet support positioned along the longitudinal axis connected to the magnet;

a voice coil support positioned along the longitudinal axis connected to the voice coil, the voice coil support operable to maintain axial alignment of the voice coil with the magnet and permitting relative axial movement of the voice coil and the magnet;

a first flexure plate and a second flexure plate positioned from the first flexure plate in a direction transverse to the longitudinal axis, the first and the second flexure plates connected to the magnet support;

a third flexure plate positioned between the first and the second flexure plates and connected to the voice coil support; and a ground plate connected to the first, the second and the third flexure plates, wherein the ground plate receives substantially no axial recoil forces on axial movement of the voice coil and the magnet.

9. The actuator of claim 8 wherein the magnet support further comprises a first and a second rigid end plate separated along the longitudinal axis, each end plate having slots on opposing ends of the plates aligned along the longitudinal axis.

10. The actuator of claim 9 wherein the voice coil support further comprises a first and a second rigid end plate separated along the longitudinal axis and connected by two crossbars each positioned within one of the aligned slots in the magnet support end plates allowing for the relative movement of the magnet support and the voice coil support along the longitudinal axis.

11. The actuator of claim 8 wherein the first, the second and the third flexure plates further comprise an inner portion connected to one of the respective magnet support and the voice coil support and an outer portion connected to the ground plate, the inner portion is connected to the outer portion by a flexure that is extensible and compressible along the longitudinal axis.

12. The actuator of claim 11 wherein the flexure further comprises a first flexure positioned at a first end of the inner portion and a second flexure positioned at a second end of the inner portion.

13. The actuator of claim 12 wherein each flexure comprises a first flexure band and an independent second flexure band separated along the longitudinal axis, each flexure band having a first band member and a second band member connected to the first band member by an end.

14. The actuator of claim 13 wherein the first flexure first band is connected to a first edge of the flexure plate inner portion and the second flexure first band is connected to a second edge of the inner portion separated from the first edge in a direction transverse to the longitudinal axis.

15. The actuator of claim 8 wherein the first, the second and the third flexure plates have an individual stiffness along the longitudinal axis substantially equal to one another.

16. The actuator of claim 8 wherein the natural frequency of the magnet is substantially equal to the natural frequency of the voice coil along the longitudinal axis.

17. A method for eliminating recoil forces at a stationary ground plate using a voice coil actuator, the method comprising the steps of:

providing a voice coil motor having a magnet having a first mass and a voice coil having a second mass, the magnet and the voice coil moveable with respect to each other;

providing a first flexure connected to the magnet having a first stiffness;

providing an independent second flexure connected to the voice coil having a second stiffness;

selecting a value for each of the first and the second stiffness based on the first and the second mass wherein the natural frequency of the magnet is substantially equal to the natural frequency of the voice coil; and connecting the first and the second flexures to a stationary ground plate, whereby introduction of an electrical current in the voice coil produces substantially no recoil forces on the ground plate.

18. The method of claim 17 further comprising the step of positioning at least a portion of the voice coil in an axial bore of the magnet along a longitudinal axis.

19. The method of claim 17 further comprising the step of:
adjusting at least one of the first and the second mass to eliminate any residual recoil forces at the ground plate.

20. The method of claim 17 further comprising the step of supporting the magnet and the voice coil to maintain alignment of the voice coil with the magnet.

* * * * *